Figures 1, 4:
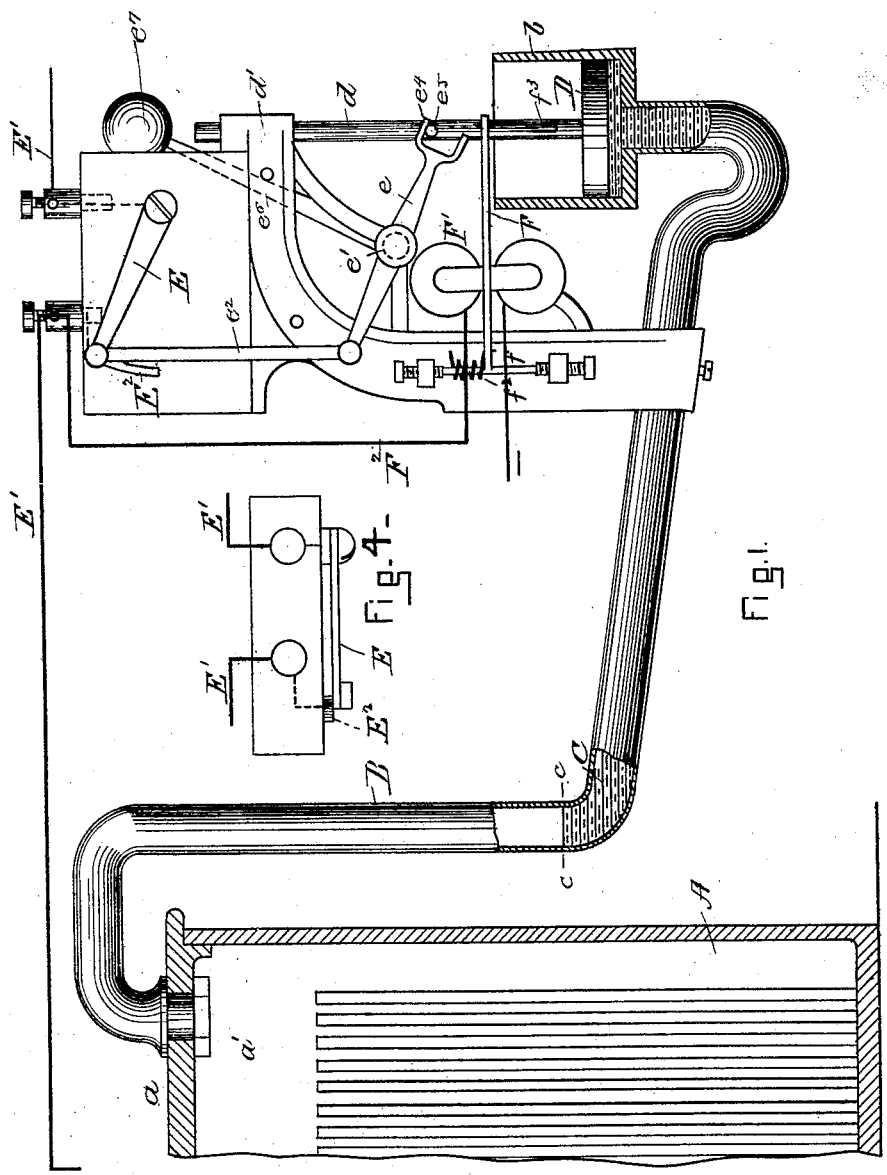

(No Model.)

A. & R. AMORY.
AUTOMATIC CUT-OFF FOR SECONDARY BATTERIES.

No. 406,981. Patented July 16, 1889.

WITNESSES

INVENTORS
Arthur Amory
Robert Amory
by Atty

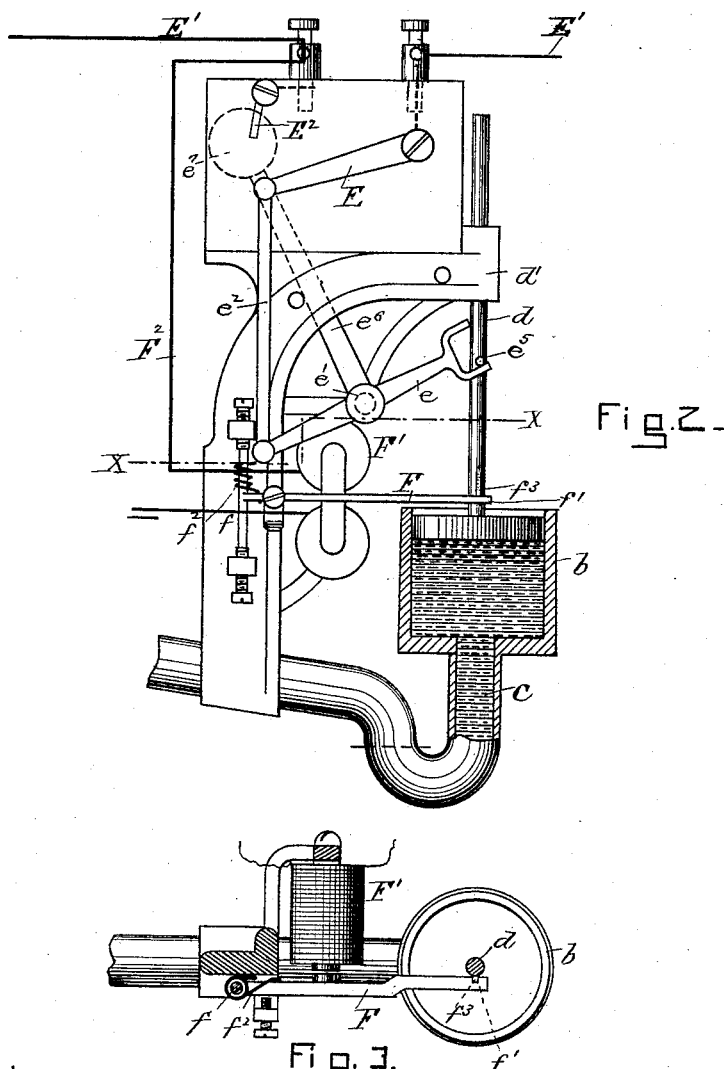

UNITED STATES PATENT OFFICE.

ARTHUR AMORY AND ROBERT AMORY, OF BOSTON, MASSACHUSETTS.

AUTOMATIC CUT-OFF FOR SECONDARY BATTERIES.

SPECIFICATION forming part of Letters Patent No. 406,981, dated July 16, 1889.

Application filed March 19, 1887. Serial No. 231,521. (No model.)

*To all whom it may concern:*

Be it known that we, ARTHUR AMORY and ROBERT AMORY, both of Boston, in the county of Suffolk and State of Massachusetts, both citizens of the United States, have invented a new and useful Improvement in Automatic Cut-Offs for Storage-Batteries, of which the following is a full, clear, and exact description, reference being had to the accompanying drawings, forming a part of this specification, in explaining its nature.

The object of our invention is to provide a novel mechanism for automatically disconnecting storage-batteries from their charging-circuits when fully charged, and also for automatically re-establishing the connection of such batteries with the charging-circuits when the electrical energy of the batteries is decreased below a certain point.

In practicing the invention we inclose the battery or one or more cells thereof in a tight box or case, so that the pressure which is generated by electrolysis is prevented from escaping from the cell or battery, and is thus permitted to accumulate to some extent in the cell or battery, and we connect the cell or battery thus inclosed by means of a tube or pipe with a chamber containing a plunger. This tube or pipe is partially filled with mercury or other suitable power-transmitting device, which extends into the plunger-chamber when the device is in condition for operation to a limited extent. Upon this mercury is floated a metal piston, which is connected with the switch. The mercury acts to communicate the pressure which its end exposed to the cell or battery receives to the piston, and is, in fact, a pressure or power transmitting medium.

In the drawings, Figure 1 represents a section of an inclosed storage-battery connected with the automatic cut-off mechanism, showing the parts in the position which they occupy when the battery is being charged. Fig. 2 represents the position of the parts of the cut-off mechanism after the switch has been operated to shut off the current from the dynamo or other means used for providing electrical energy. Fig. 3 is a view in horizontal section and plan upon and below the line $x$ $x$ of Fig. 2. Fig. 4 is a plan view of the circuit-breaker and adjacent parts.

Referring to the drawings, A represents the storage-battery, which is tightly covered by the cap $a$.

B is a pipe or tube which extends from the battery to the plunger-chamber $b$, and it is filled with mercury C to the dotted line $c$, Fig. 1. The pipe or tube opens into the chamber $a'$ of the battery, so that any pressure generated therein may enter the passage of the tube or pipe and exert its force against the upper end of the mercury column C, which is thereby actuated to transmit the force thus received to the metal plunger D. This plunger is floated on the mercury in the chamber $b$, and serves to actuate the switch by the movement which is communicated to it through or by the mercury column. Connected with the plunger is a rod $d$, which is guided in a hole formed in the bracket $d'$. This rod is connected with the switch E by means of the weighted lever $e$, which is pivoted at $e'$ and is connected with the switch E by the link $e^2$. The lever $e$ has its end $e^4$ connected with the rod $d$ in such a manner as to permit a certain degree or extent of movement in relation to the rod, and this is represented as obtained by means of the pin $e^5$ on the rod and by means of the forked end $e^4$, or providing the end with two branches separated from each other by a space of the required extent. The lever $e$ also has a vertical arm $e^6$, carrying a weight $e^7$. The switch E is in the dynamo-circuit.

At the beginning of the operation of the device the parts are substantially in the position represented in Fig. 1—that is, the circuit from the dynamo to the battery is closed, the end of the switch E being in contact with the long contact-point $E^2$. The generating of pressure in the cell or battery causes the mercury column to be gradually moved or forced into the chamber B to force the plunger D upward, and this movement of the mercury column and plunger continues so long as the switch remains in contact with the long contact-point $E^2$. The switch is of of course during this movement being drawn down upon the long contact-point $E^3$ by the action of the lever $e$, and this moves the arm $e^6$ from the position represented in Fig. 1 until it has been moved a little past the perpendicular position, when it operates to disengage or move the switch from the contact-point $E^2$ and causes the parts to assume the position in relation to each other represented in Fig. 2. This movement or disengagement of the switch from the contact-point is so timed and regulated as to take place upon the completion of the charging of a cell or battery.

To prevent the contact being re-established until the storage battery or cell has expended its electrical energy, we have arranged a device for holding the plunger in an elevated position and the parts in the position represented in Fig. 2 until it becomes necessary to again close the circuit of the dynamo, and this device comprises a lever F, pivoted at $f$, adapted to have its outer end $f'$ drawn in or moved toward the rod $d$ by the electro-magnet $F'$ in the storage-battery circuit $F^2$ and to be moved in an opposite or reverse direction by a spring $f^2$. There is formed on the rod $d$ a stop $f^3$, having an inclined upper surface, and upon the upward movement of the rod the stop rides by the end of the lever, and a contact being established by the movement of the switch the battery or cell is supplied with electrical energy, causing the electro-magnet $F'$ to operate to draw and hold the lever until the charging-circuit is broken and the electrical energy in the cell or battery is decreased sufficiently to cause the spring $f^2$ to overcome the action of the electro-magnet, when the lever F is thrown or moved horizontally sufficiently to cause its end $f'$ to be moved away from the rod $d$ and the stop $f^3$, when the plunger falls and the parts assume the operative position represented in Fig. 1.

The method of gaging or controlling the supply of electrical energy delivered by the dynamo to the storage-battery we consider to be of very material importance, in that it prevents waste of electrical energy and in that it provides for the immediate automatic storage or charging of the storage-battery after it has given off its charge, so that the battery may be economically and automatically operated.

We would say that we do not intend to be understood as limiting the invention to the particular mechanism herein shown and specified for operating the switch, as there are many other mechanical equivalents for the devices herein specified.

We would say that in lieu of a mercury column glycerine or any suitable liquid may be used as a power-transmitting medium, or air; but we do not limit ourselves to this especial form of power-transmitting medium, as we consider that a diaphragm, movable piston or plate, or any part adapted to be moved by the pressure generated in the closed chamber containing the cell or battery connected with a switch in the charging-circuit, so as to transmit the effect of the pressure thereon to it, is the mechanical equivalent as a power-transmitting medium for that shown and above described. We would say, also, that we do not confine the application of our invention to a storage battery or cell charged by a dynamo-machine, as it may be used in any storage cell or battery charging circuit connected with any source for supplying electrical energy to the cell or battery.

Having thus fully described our invention, we claim and desire to secure by Letters Patent of the United States—

1. An automatic cut-off for storage-batteries, consisting of the combination of a tight casing or box inclosing a battery or a cell thereof to prevent the escape of pressure accumulating therein, a chamber, a pipe connecting said casing or box with said chamber and containing a power-transmitting medium, a piston or plunger in said chamber, and a switch connected with said piston or plunger, substantially as set forth.

2. The combination, with a tight casing or box and a battery or a cell thereof inclosed therein, of a plunger-chamber, a pipe connecting said chamber with said casing or box and containing a column or body of mercury or other power-transmitting medium, a piston or plunger arranged in said chamber and provided with a stem or rod, an actuating-lever operated by said rod, a switch connected with said lever, an extended contact-point over which the said switch is moved, and an overbalancing-weight to cause said switch to be engaged with or disengaged from said contact-point, substantially as set forth.

3. The combination, with a storage-battery, of a switch in a charging-circuit, operated or controlled by pressure generated by the action of charging the battery, a weight for moving the said switch, and an electrically-controlled holding device connected with the battery-circuit for holding the switch open until the storage-battery has lost or discharged its electrical energy, as and for the purposes specified.

4. The combination of a storage-battery or a cell thereof inclosed in a tight case or box and the charging-circuit $E'$, a pipe or tube connecting the chamber of said battery or cell with a chamber $b$, and the body or column C of mercury or other power-transmitting medium therein contained, the plunger D, the rod $d$, having a stop $f^3$, the weighted lever $e$, the switch E in the charging-circuit, the contact-point $E^2$, and the stop-lever F, operated by an electro-magnet in the battery-circuit $F^2$ in one direction and by the spring $f^2$ in the reverse direction, substantially as described.

5. In an automatic cut-off for a storage-battery, a switch in the charging-circuit, and mechanism for operating the same to close the circuit, and a holding device for holding the switch or its actuating mechanism from closing the circuit until the storage-battery is discharged of its electrical energy, controlled in its operation by a circuit connected by said battery, substantially as specified.

6. The combination of the lever or latch controlling the time of operation of the switch E of the charging-circuit E' of a storage-battery with an electro-magnet operated by said battery and a spring adapted to move the lever in a direction opposite that from which it is operated by the said electro-magnet, as and for the purposes specified.

ARTHUR AMORY.
ROBT. AMORY.

Witnesses:
   J. M. DOLAN,
   FRED. B. DOLAN.